(12) United States Patent
Liao et al.

(10) Patent No.: US 7,868,049 B2
(45) Date of Patent: Jan. 11, 2011

(54) ORGANIC/INORGANIC HYBRID MATERIAL AND METHOD FOR MANUFACTURING THE SAME

(75) Inventors: Wei-Han Liao, Hsinchu (TW); Chih-Hsiang Lin, Taipei (TW); Hsin-Ching Kao, Hsinchu County (TW); Hsun-Yu Li, Taichung (TW); Shu-Ling Yeh, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 766 days.

(21) Appl. No.: 11/822,024

(22) Filed: Jun. 29, 2007

(65) Prior Publication Data

US 2009/0005513 A1 Jan. 1, 2009

(51) Int. Cl.
*B01J 13/00* (2006.01)
(52) U.S. Cl. ............ 516/100; 525/329.4; 525/329.5
(58) Field of Classification Search .......... 516/100; 525/329.4, 329.5
See application file for complete search history.

(56) References Cited

U.S. PATENT DOCUMENTS

| | | | |
|---|---|---|---|
| 5,429,899 A | | 7/1995 | Chiba et al. |
| 6,068,690 A | * | 5/2000 | Aizawa ............... 106/287.19 |
| 6,103,584 A | | 8/2000 | Metzler et al. |
| 6,228,796 B1 | | 5/2001 | Arakawa et al. |
| 6,444,751 B1 | * | 9/2002 | Chujo et al. .......... 525/61 |

FOREIGN PATENT DOCUMENTS

| | | |
|---|---|---|
| JP | 2002-516249 A | 6/2002 |
| JP | 2003-44504 A | 2/2003 |

OTHER PUBLICATIONS

Chen et al., "Thermal properties, specific interactions, and surface energies of PMMA terpolymers having high glass transition temperatures and low moisture absorptions", Polymer 46, Mar. 2005, 2354-2364.*

* cited by examiner

*Primary Examiner*—Ling-Siu Choi
*Assistant Examiner*—Chun-Cheng Wang
(74) *Attorney, Agent, or Firm*—Birch, Stewart, Kolasch & Birch, LLP

(57) ABSTRACT

The invention provides an organic/inorganic hybrid material and the method for manufacturing the same. A variety of functional monomers are co-polymerized to form a copolymer. The copolymer is subjected to sol-gel reactions with metal alkoxide oligomers to form an organic/inorganic hybrid material. The hybrid material has a high refractive index, a low moisture absorption, a high light transmission ratio, and a high glass transition point, such that the material can be applied in high light extraction efficient LED sealing materials, thin and light myopia/hypropia lens, portable projector lens, high brightness LCD prism films, solar cell refractive photoelectric conversion mirrors, and camera phone/digital camera lens.

3 Claims, 5 Drawing Sheets

ORGANIC/INORGANIC HYBRID MATERIAL AND METHOD FOR MANUFACTURING THE SAME

BACKGROUND OF THE INVENTION

1. Field of the Invention

The invention relates to an organic/inorganic hybrid material and the method for manufacturing the same, in particular to a metal alkoxide oligomer utilized in the organic/inorganic hybrid material, such that the material can be applied in high light extraction efficient LED sealing materials, thin and light myopia/hypropia lens, portable projector lens, high brightness LCD prism films, solar cell refractive photoelectric conversion mirrors, and camera phone/digital camera lens.

2. Description of the Related Art

Materials science is roughly divided into two major fields: organic materials and inorganic materials. The organic material such as polymer is easily moldable with better flexibility. The inorganic materials are better in mechanical strength, chemical resistance, and thermal stability. Recently, integrating organic and the inorganic materials have been a focus for those skilled in this art. The optical organic/inorganic hybrid materials are described below.

In development of high glass transition temperature (hereinafter $T_g$) and low moisture absorption polymethyl methacrylate (hereinafter PMMA) material, the properties of monomers in the copolymer are first considered. Although many types of monomers enhance the $T_g$ and reduce moisture adsorption, three major factors should be evaluated simultaneously when choosing a type of monomer. The first factor is cost and availability of the monomers. Many monomers significantly improve the thermal properties of the product, however, they are expensive and hard to mass-produce, such that the mass production of the product cannot be ensured. This factor is the most important in choosing a type of monomer. Meanwhile, in certain conditions, some inexpensive monomers substantially improve product properties in low additive dosages, reducing product costs. Correspondingly, these monomers are the main focus of this invention. The second factor to evaluate when choosing a type of monomer is minimal property influence, such as transparency, birefringence, non-yellowing, moldability, and blue-light transparency. The last, and third factor is the monomers reaction to manufacturing and design influence, such as conditional reaction, reaction to corrosion resistance of the equipment, manipulation convenience, and innate nature of the monomer (e.g. toxicity, odor, or flammability).

In previous patents or research papers, monomers with hard and steric hindered side chain were introduced to copolymer with PMMA for enhancing the $T_g$ of the PMMA copolymer. The monomers with hard and steric hindered side chain include tricyclodecyl methacrylic acid, tricyclodecyl acrylic acid, cyclohexyl methacrylic acid, n-octadecyl methacrylic acid, norbornyl methacrylic acid, and the likes. The method however, has a shortcoming of requiring a high additive dosage of the monomer with hindered side chain. For example, the additive dosage required is higher than 70 mol % to enhance the $T_g$ above 120° C. of the PMMA copolymer. Because the monomers with hindered side chain are expensive, the high additive dosage decreases the economic value. Additionally, PMMA contain carbonyl group which has strong dipole interactions. If other monomers in the PMMA copolymer cannot provide sufficient molecular interaction, the $T_g$ of the PMMA copolymer will be seriously reduced. Accordingly, previous research has so far failed to improve the $T_g$ of the PMMA copolymer by introducing inexpensive monomers.

In development of organic/inorganic hybrid materials, the high refractive index materials are made by two principal methods. The metal oxide is introduced into polymer matrix by physical blending or chemical sol-gel process. Physical blending limits the content ratio of inorganic powder in the polymer matrix, such that the refractive index and the transparency of the material can not be efficiently improved.

Chemical sol-gel process, dissolves the organic polymer and inorganic salt such as metal alkoxide, non-metal alkoxide, or other inorganic salt in an acidic solution. The inorganic salt is then hydrolyzed and reacted with the organic polymer to form a sol-gel material.

As disclosed in Japan Patent Publication No. 2002-516249-W and 200344504-A, $TiO_2$ was introduced into the polymer by a sol-gel process. The sol-gel process includes dissolving inorganic precursor, organic monomer, and surface modifier in solvent, processing hydrolyzation/condensation to form powder, and polymerizing the powder to form a product. The product has a refractive index of greater than 1.5.

As disclosed in U.S. Pat. No. 6,103,584, the organic/inorganic hybrid polymer is obtained by the process in which a polymer having a polycarbonate and/or a polyarylate moiety as a main frame and having a metal alkoxide group as a functional group, is hydrolyzed and polycondensed to form crosslinkages. The alkoxide can be oligomer type such as alkoxysilane oligomer.

As disclosed in U.S. Pat. No. 6,228,796 and 6,068,690, an organic-inorganic hybrid polymer material in which an organic polymer component and a metal oxide component are covalently bonded with each other, which is obtained by hydrolyzing and polycondensing a solution or a wet gel which comprises an organic polymer having an alkoxymetal group as a functional group or an organic polymer having a functional group reactable with a metal alkoxide compound, and a metal alkoxide compound. Although in Example 6 of '796 the titanium alkoxide oligomer is utilized as a photo-catalysis layer, the organic polymer still basically serves as a backbone.

Metal alkoxide oligomer is applied in varied fields. For example, Chiba disclosed a magnetic coating material applied in tape or disk in U.S. Pat. No. 5,429,899. The magnetic material includes titanium alkoxide oligomer as the following formula:

Linear type such as those having the following formula:

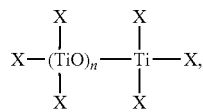

wherein n is 2-40.

Ladder type such as those having the following formula:

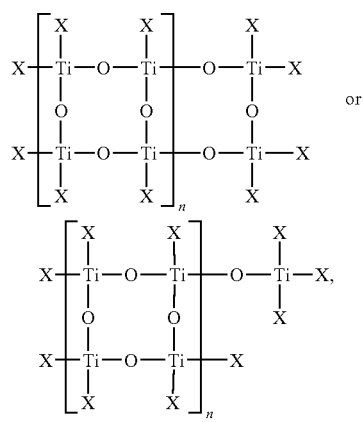

wherein n is 1-40.

Highly condensed type such as those having the following formula:

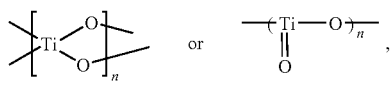

wherein n is 2-40.

In the above formula, X represents independently hydroxyl group, ether group, halogen, or other functional groups.

The described titanium alkoxide oligomer is only mixed with organic molecules to become a magnetic coating material; however, the titanium alkoxide oligomer is not integrated into polymer backbone.

Another application of metal alkoxide oligomer is disclosed in U.S. Pat. No. 6,068,690. Aizawa et al. mix the titanium alkoxide oligomer solution and the zirconium alkoxide oligomer solution to form Ti—O—Zr precursor. The Ti—O—Zr precursor is further reacted with lead alkoxide oligomer to form Pb(Ti—O—Zr) alkoxide applied in ferroelectric film. Although several titanium alkoxide oligomers are applied in this patent, they are not applied in organic/inorganic hybrid materials.

SUMMARY OF THE INVENTION

The invention provides a method for manufacturing an organic/inorganic hybrid material, comprising providing a copolymer and a metal alkoxide oligomer and processing a sol-gel reaction to form an organic/inorganic hybrid material, wherein the copolymer is co-polymerized by methyl methacrylate, methyl acrylamide, and styrene.

The invention also provides an organic/inorganic hybrid material, comprising (a) a copolymer and (b) a metal alkoxide oligomer, wherein the copolymer and the metal alkoxide oligomer are crosslinked by a sol-gel reaction to form a reticular structure, and the copolymer is co-polymerized by methyl methacrylate, methyl acrylamide, and styrene. The organic/inorganic hybrid material has a high refractive index, low moisture absorption, a high light transmission ratio, and a high $T_g$.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
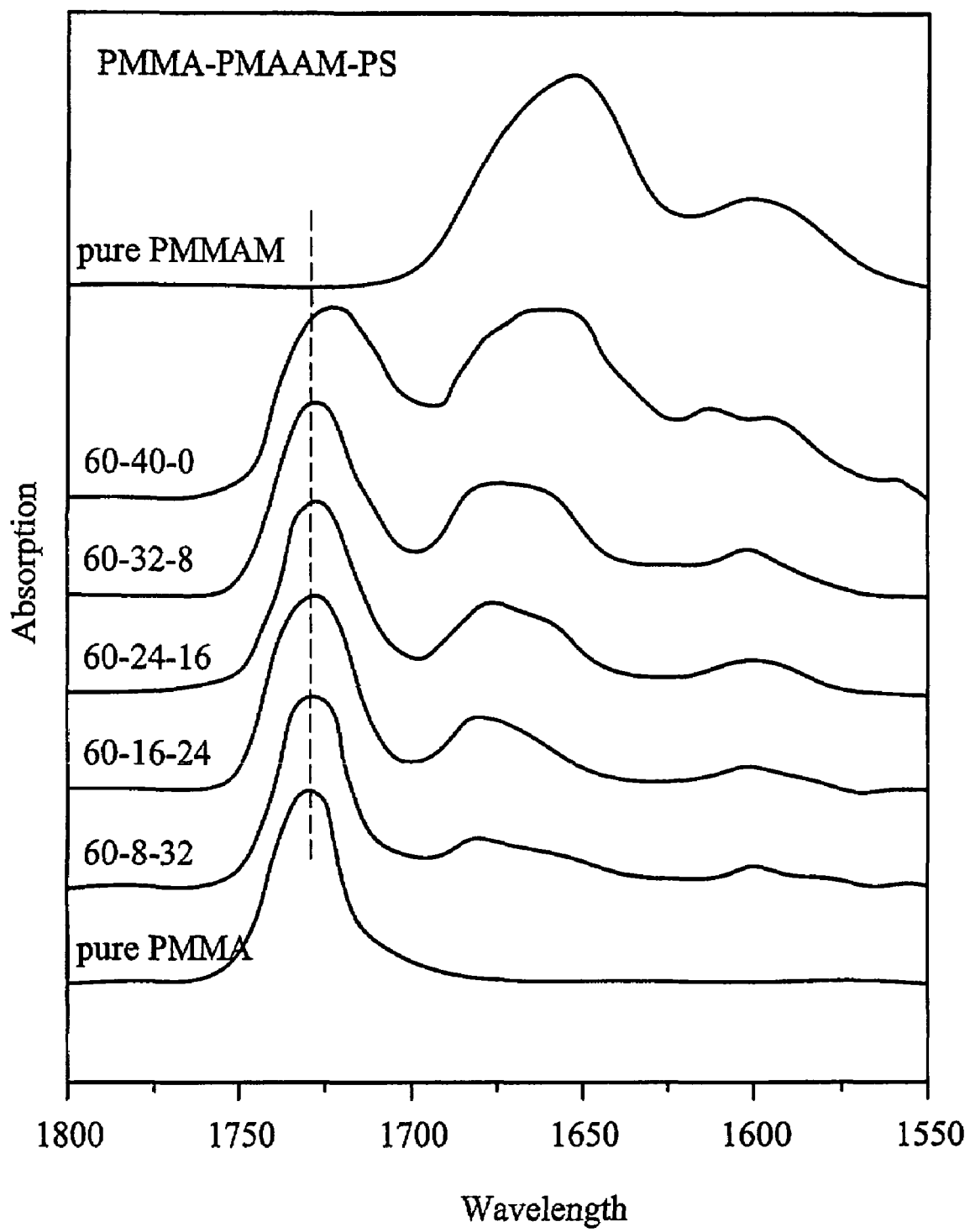
FIG. 1 is an infrared spectrum of a copolymer having 60 wt % PMMA monomer.
Figure 2:
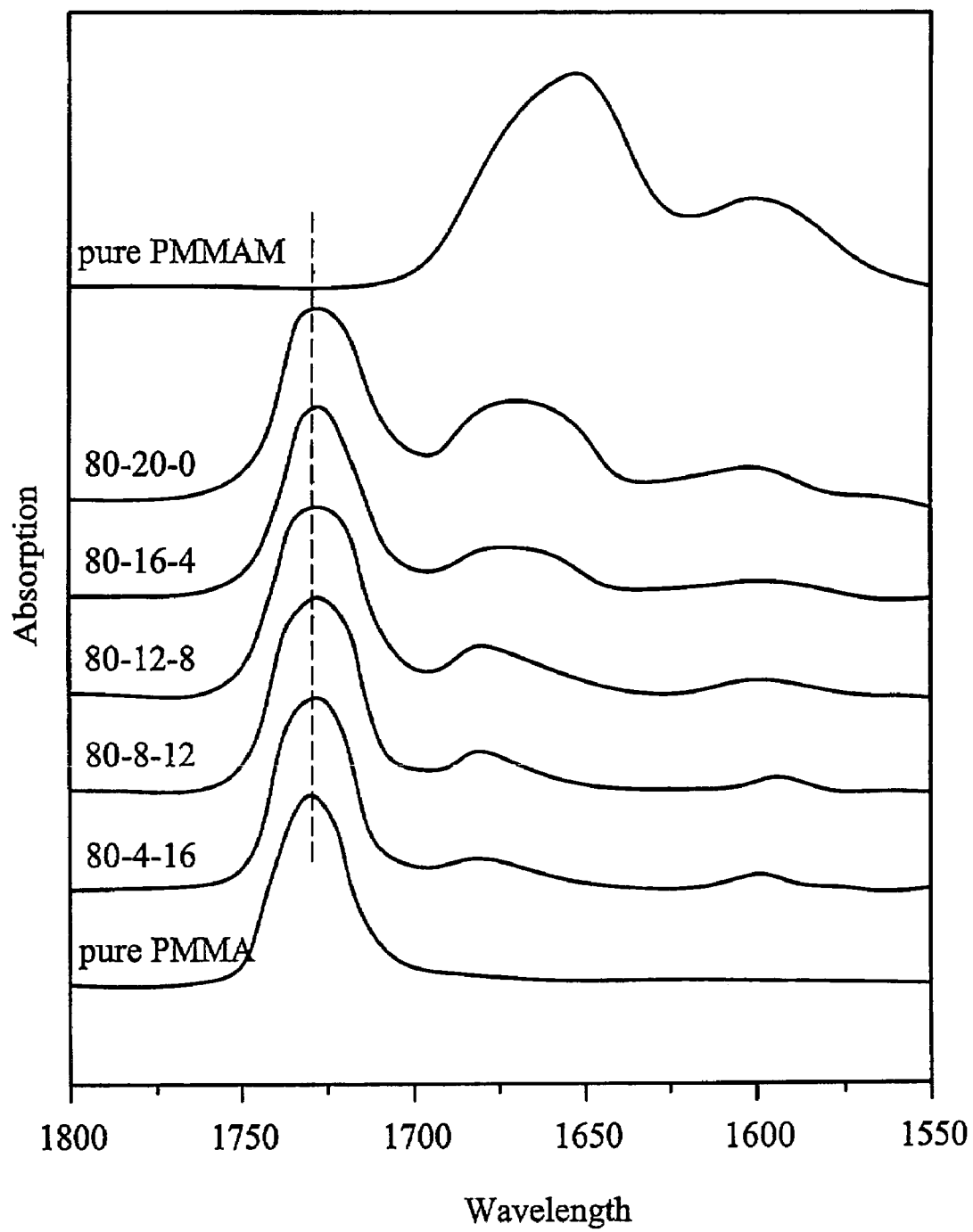
FIG. 2 is an infrared spectrum of a copolymer having 80 wt % PMMA monomer.
Figure 3:
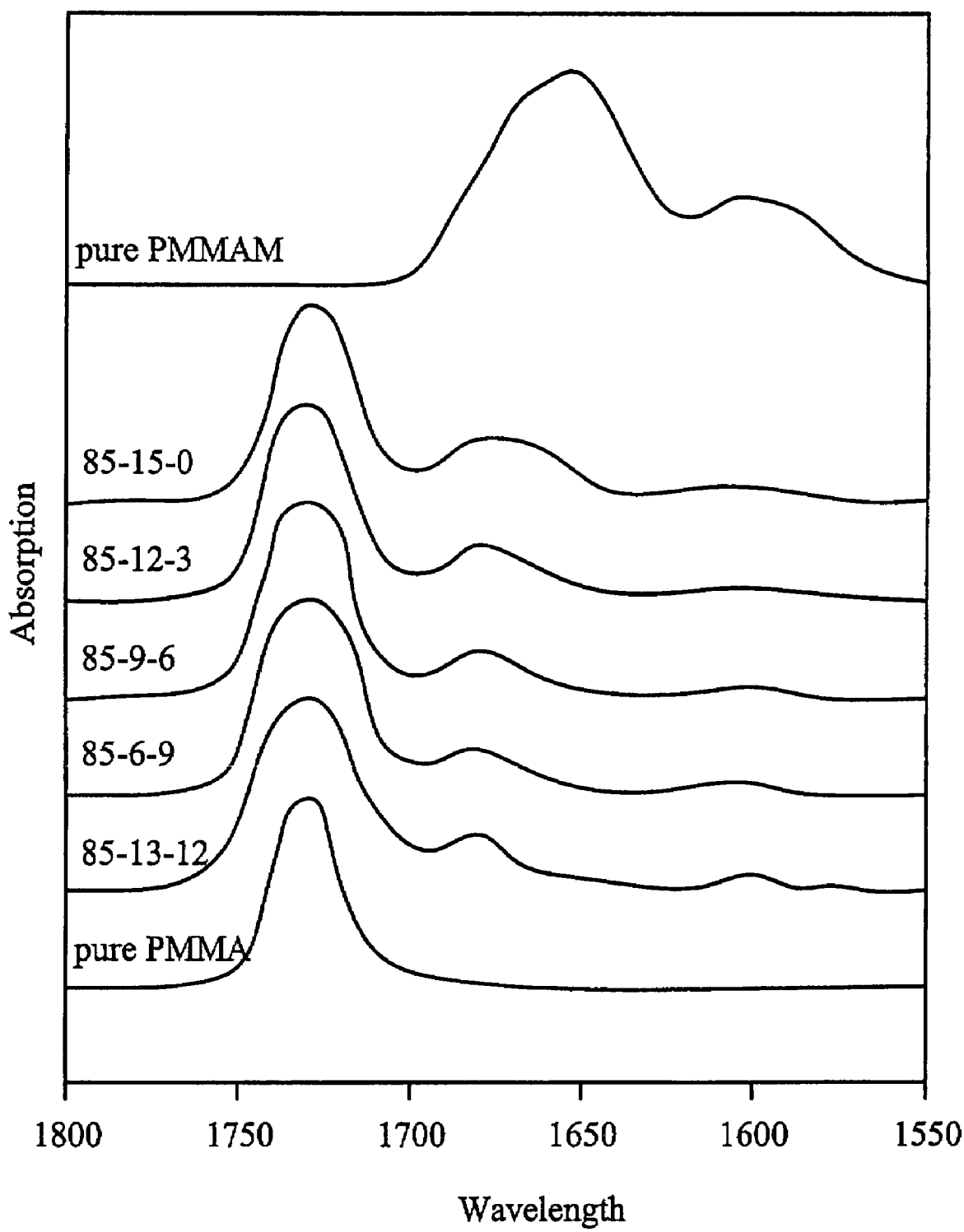
FIG. 3 is an infrared spectrum of a copolymer having 85 wt % PMMA monomer.
Figure 4:
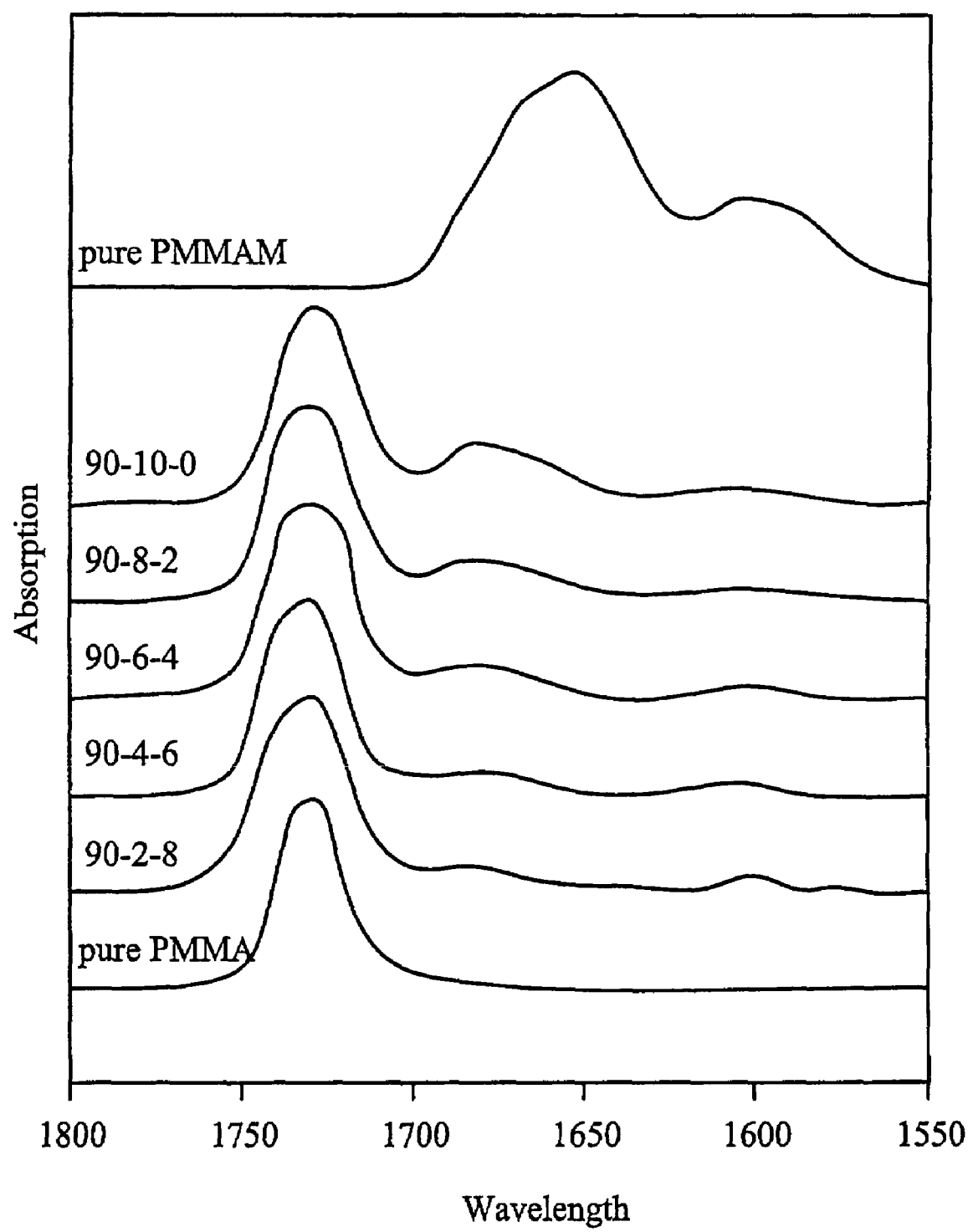
FIG. 4 is an infrared spectrum of a copolymer having 90 wt % PMMA monomer.

The following description is of the best-contemplated mode of carrying out the invention. This description is made for the purpose of illustrating the general principles of the invention and should not be taken in a limiting sense. The scope of the invention is best determined by reference to the appended claims.

The invention provides an organic/inorganic hybrid material having high refractive index, low moisture absorption, high light transmission ratio, and high $T_g$, and method for manufacturing the same. The organic/inorganic hybrid material can be applied in high light extraction efficient LED sealing materials, thin and light myopia/hypropia lens, portable projector lens, high brightness LCD prism films, solar cell refractive photoelectric conversion mirrors, and camera phone/digital camera lens.

For achieving the described properties, the invention utilizes inorganic oilgomer precursor to reduce the sol-gel process time. The covalent bond acceptor of the polymer matrix reacts with the inorganic alkoxide powder to form chemical bonding. Simultaneously, other functional monomers are co-poymerized to form organic/inorganic hybrid material, such that the dispersion and content ratio of the inorganic powder in the polymer matrix are improved. While refractive index of the organic/inorganic hybrid material is enhanced, the light transmission ratio, thermal stability, and moisture absorption thereof are maintained or improved.

In conventional methods, $TiO_2$ is directly introduced into organic polymer by sol-gel process. This method has shortcomings such as a long reaction time and uneven dispersion. For enhancing the content ratio of the metal in organic/inorganic hybrid material, the invention utilizes the metal alkoxide oligomer (MW=500-5000, 20 -80 wt %) as a precursor to react with a copolymer (MW=3000-12000, 80-20 wt %). As a result, the organic/inorganic hybrid material obtains a high refractive index, low moisture absorption, a high light transmission ratio, and a high $T_g$.

The conventional sol-gel process utilizes metal alkoxide monomer, such that the process period is more than 10 hours. Furthermore, the metal oxide (e.g. $TiO_2$) from metal alkoxide easily aggregates to degrade the product. For solving the described problems, the high reactive metal alkoxide oligomers serve as precursor in the invention to reduce reaction period to less than one hour, with most around thirty minutes. Accordingly, the product has even composition and improved properties. Compared to the metal alkoxide oligomer, the metal alkoxide monomer has to process two reactions after hydrolyzation, first forming a metal alkoxide oligomer and crosslinking to organic polymer, and second forming a material having a polymer backbone with functional groups of metal alkoxide. Because the degree of polymerization of the metal alkoxide oligomer formed from the conventional metal alkoxide monomer is too low, it is impossible to form another backbone of the metal alkoxide oligomer. The degree of polymerization of the metal alkoxide oligomer is influenced by factors such as the ratio of the metal alkoxide monomer to the polymer, temperature, solvent types, such that the properties of the hybrid material may be substantially changed by slight variability of the described factors. Thus, making it extremely troublesome to modify the organic/inorganic hybrid materials, especially for reproducibility and scale-up. The invention utilizes the pre-oligomerized metal alkoxide (MW is 500 to 5000) as precursor, thereby preventing the difficulties in controlling the reactions of the metal alkoxide monomer. The metal alkoxide oligomer in the invention has metal including Ti, Zr, Al, or Zn, and structure of linear type, ladder type, and highly condensation type as disclosed in U.S. Pat. No. 5,429,899. The sol-gel process of the invention can be represented below, but not limited to.

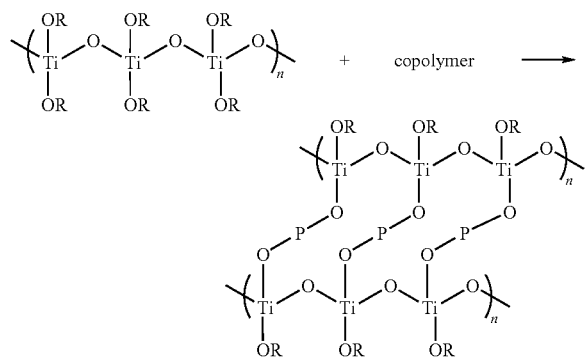

In the above formula, R represents independently $C_{1-8}$ alkyl group, P represents independently organic copolymer. The hybrid material of the above formula has two types of backbone: a copolymer backbone and a metal alkoxide oligomer backbone. The above formula only represents the reticular structure, and is not limited to it. One polymer is not limited to covalently being bonded to two metal alkoxide oligomers. One polymer is usually covalently bonded to two or more metal alkoxide oligomers which are further covalently bonded to other oligomers, and thus forming a reticular structure hybrid material.

The molecular interaction of the polymer is considered in the invention. Inherently, PMMA is a hydrogen bonding acceptor. Utilizing the hydrogen bonding interaction, a hydrogen bonding donor can be introduced as a monomer copolymerized with PMMA to significantly enhance the $T_g$ of the copolymer. It is known that hydrogen bonding can efficiently reduce the free volume of the polymer and enhance the polymer $T_g$, however, the hydrogen bonding also enhances the moisture absorption of the polymer matrix. Therefore, the invention introduces a hydrogen bonding diluent such as an inexpensive styrene to reduce the moisture absorption and control cost of the polymer.

The copolymer of the invention is co-polymerized by at least two of the following functional monomers: adhesive monomer (molar ratio is 30% to 70%), hydrogen bonding donor (molar ratio is 20% to 50%), hydrophobic monomer (molar ratio is 5% to 10%), covalent bonding acceptor (molar ratio is 0.5% to 2%), or other functional monomers. The adhesive monomer, functioned to increase the adhesion between the organic/inorganic hybrid material and the substrate, includes methacrylate or epoxy monomers such as methyl methacrylate. The hydrogen bonding donor, functioned to increase the bonding density and $T_g$ of the copolymer, includes hydroxyl, carboxylic acid, amino, and amido monomers such as methyl methacrylate. The hydrophobic monomer, functioned to reduce the moisture absorption of the organic/inorganic hybrid material, includes aromatic monomers such as styrene. The covalent bonding acceptor is functioned to covalent bond the copolymer and the metal alkoxide oligomer. The covalent bonding acceptor enhances the organic/inorganic interaction, the dispersion degree of the metal alkoxide oligomer in the hybrid material, and light transmission degree and refractive index of the hybrid material. The covalent bonding acceptor, having hydroxyl, carboxylic acid, or amino terminal group, may be condensed with the metal alkoxide oligomer to form covalent bondings. Moreover, the covalent bonding acceptor has a carbon-carbon double bond to form the backbone of the copolymer. Both of the described bonds formed from the covalent bonding acceptor can improve adhesive strength. A suitable covalent bonding acceptor is 2-hydroxyl ethyl methyl methacrylate. For those skilled in the Art, adjustments to the type, ratio, and arrangement of the monomers are available. For example, the arrangement can be block or alternative. The ratio of adhesive monomer, hydrogen bonding donor, hydrophobic monomer, and covalent bonding acceptor is not limited to 1:1:1:1. Furthermore, other functional monomers can be introduced in the copolymer.

The copolymer can be co-polymerized by photo initiation, thermal initiation, or microwave initiation. The photo initiator includes but is not limited to arylphenone such as benzophenone acrylated benzophenone, 2-ethylanthraquinone, phenanthraquinone, 2-tert-butylanthraquinone, 1,2-benzanthraquinone, 2,3-benzanthraquinone, 2,3-dichloronaphthoquinone, or benzyl dimethyl ketal. The photo initiator also includes benzoins such as benzoin methyl ether, benzyl ethyl ether, benzoin isobutyl ether, benzoin phenyl ether, methyl benzoin, ethyl benzoin, or other suitable benzoins. The thermal initiator can be substituted or unsubstituted organic peroxide, azo compound, pinacol, thiuram, or combinations thereof. The organic peroxide can be benzoyl peroxide, p-chlorobenzoyl peroxide, methyl ethyl ketone peroxide, tert-butyl peroxide, cumene hydroperoxide, di-sec-butyl peroxide, or 1,1-di(tert-butylperoxy)-3,3,5-trimethylcyclohexane. The azo compound includes 2,2'-azobis(2,4-dimethyl valeronitrile), (1-phenylethyl)azodiphenylmethane, dimethyl 2,2'-azobis(1-cyclohexanecarbonitrile), 2,2-azobisisobutyronitrile (hereinafter AIBN), or 2,2-azobis(2-methylpropane). The micro initiation includes microwave heating at 500W for 3-5 minutes or 90W for 10-20 minutes.

The organic/inorganic hybrid material of the invention has high $T_g$, high refractive index, high light transmission ratio, and low moisture absorption. In some embodiments of the invention, the organic/inorganic hybrid material has a $T_g$ higher than 160° C., a refractive index higher than 1.67, a light transmission ratio greater than 88%, and moisture absorption of less than 0.5%. Because of the described properties, the hybrid material can be applied in high light extraction efficient LED sealing materials, thin and light myopia/hypropia lens, portable projector lens, high brightness LCD prism films, solar cell refractive photoelectric conversion mirrors, and camera phone/digital camera lens.

EXAMPLES

Example 1

Synthesis of High $T_g$ Copymer poly(methyl methacrylate-co-methacrylamide-co-styrene Methyl methacrylate, methacrylamide, and styrene were charged in a two-necked round bottomed flask and dissolved by 1,4-dioxane utilizing nitrogen. The solution was heated to 80° C., and then AIBN was added and allowed to react for 24 hours, and then isopropane was added to precipitate the crude and then filtered to obtain the crude. When purifying the crude, the steps of dissolving, precipitating, and filtering the crude were repeated several times. Subsequently, the purified crude was dried in a 70° C. oven for 12 hours to yield the poly(methyl methacrylate-co-methacrylamide-co-styrene) and Poly(MMA-co-MAAM-co-S). The recipe of this copolymer was as described in Table 1.

The spectrum corresponding to copolymers having different content ratios of PMMA in Table 1 were shown as in FIGS. 1-4. Pure PMAAM polymer had peaks, 1650 cm$^{-1}$ and 1600 cm$^{-1}$, corresponding to stretching vibration of C=O in amido group and bending vibration of N—H in amido group, respectively. Generally, the bending vibration of N—H and the stretching vibration of C=O have absorption intensity ratio of 1/2 to 1/3. In pure PMMA polymer, the carbonyl group not limited by hydrogen bonding had a peak of 1730 cm$^{-1}$. In copolymer poly(MMA-co-MAAM), if MMA monomer occupies a higher content ratio, the absorption of the amino group will shift to a higher wave number with weaker intensity. While the MAAM monomer occupied a higher content ratio, the carbonyl group of the PMMA shifted to a lower wave number, thus verifying the existence of the hydrogen bonding. Meanwhile, the stretching vibration of C=O not bound by hydrogen bonding has a higher wave number. When styrene was introduced into the copolymer, the stretching vibration of C=O had weaker intensity. Accordingly, the carbonyl group of the PMMA and the amino group of the PMAAM resulted in hydrogen bonding, and polystyrene (PS) diluted the PMAAM segment.

Figure 5:
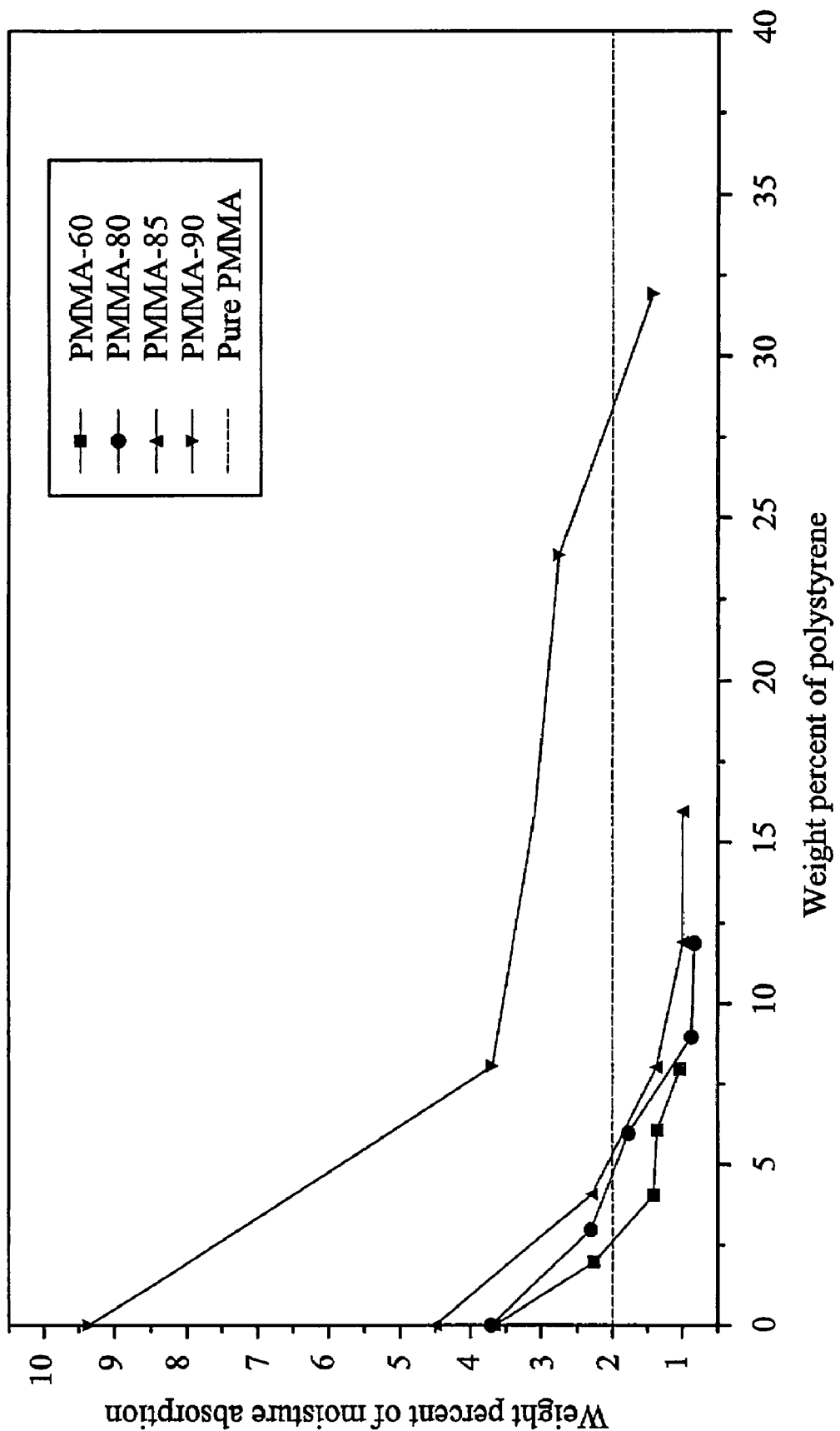
FIG. 5 is a diagram showing different moisture absorption ratios corresponding to copolymers having different content ratios of PMMA monomer.

Because hydrogen bonding interaction is easily formed between water and carbonyl group of the PMMA, pure PMMA has a higher moisture absorption. For reducing the moisture absorption of the PMMA, hydrophobic segments such as non-polar styrene was introduced to the copolymer containing PMMA. FIG. 5 shows the moisture absorption tests of the pure PMMA polymer and the poly(MMA-co-MAAM-co-S) copolymer. Because the hydrogen bonding is more easily formed between water and the MAAM monomer, poly(MMA-co-MAAM) has a higher moisture absorption compared to pure PMMA polymer. However, the introduction of PS efficiently reduced the moisture absorption of the copolymer. Poly(MMA-co-MAAM-co-S) copolymer resulted in high $T_g$ and low moisture absorption, such that the copolymer of the invention can replace pure PMMA or polycarbonate to be applied in high efficient optic devices with lower costs.

TABLE 1

| Polymer | Monomer Feed (wt %) | | | Polymer Composition (wt %) | | | Mw (g/mole) | Tg (° C.) |
| --- | --- | --- | --- | --- | --- | --- | --- | --- |
| | PMMA | PMAAM | PS | PMMA | PMAAM | PS | | |
| PMMA | 100 | 0 | 0 | 100 | 0 | 0 | 57000 | 100.0 |
| 90-10-0 | 90 | 10 | 0 | 92.8 | 7.2 | 0 | 54800 | 126.5 |
| 90-8-2 | 90 | 8 | 2 | 91.0 | 6.8 | 2.2 | 32400 | 145.3 |
| 90-6-4 | 90 | 6 | 4 | 90.6 | 5.2 | 4.2 | 24800 | 132.1 |
| 90-4-6 | 90 | 4 | 6 | 90.3 | 3.5 | 6.2 | 20200 | 125.7 |
| 90-2-8 | 90 | 2 | 8 | 90.0 | 1.7 | 8.3 | 16000 | 123.3 |
| 85-15-0 | 85 | 15 | 0 | 88.6 | 11.4 | 0 | 38300 | 144.5 |
| 85-12-3 | 85 | 12 | 3 | 86.4 | 10.4 | 3.2 | 28500 | 133.2 |
| 85-9-6 | 85 | 9 | 6 | 86.0 | 7.7 | 6.3 | 26800 | 129.9 |
| 85-6-9 | 85 | 6 | 9 | 85.4 | 5.2 | 9.4 | 25600 | 125.9 |
| 85-3-12 | 85 | 3 | 12 | 85.0 | 2.5 | 12.5 | 24500 | 118.1 |
| 80-20-0 | 80 | 20 | 0 | 85.8 | 14.2 | 0 | 22000 | 149.0 |
| 80-16-4 | 80 | 16 | 4 | 81.8 | 14.0 | 4.2 | 19000 | 139.1 |
| 80-12-8 | 80 | 12 | 8 | 81.2 | 10.4 | 8.4 | 18000 | 134.1 |
| 80-8-12 | 80 | 8 | 12 | 80.5 | 7.0 | 12.5 | 12500 | 132.7 |
| 80-4-16 | 80 | 4 | 16 | 80.0 | 3.4 | 16.6 | 10900 | 139.2 |
| 60-40-0 | 60 | 40 | 0 | 72.2 | 28.8 | 0 | 35000 | 203.1 |
| 60-32-8 | 60 | 32 | 8 | 62.8 | 28.5 | 8.7 | 9400 | 159.6 |
| 60-24-16 | 60 | 24 | 16 | 61.8 | 21.0 | 17.2 | 8800 | 148.8 |
| 60-16-24 | 60 | 16 | 24 | 60.8 | 13.8 | 25.4 | 7900 | 146.1 |
| 60-8-32 | 60 | 8 | 32 | 60.0 | 6.8 | 33.2 | 7400 | 136.7 |

Example 2

Organic/inorganic Hybrid Material 100 g of linear titanium alkoxide oligomer (MW was about 2000) was dissolved in 100 mL tetrahydrofuran (pH=1). The solution was then added to 80 g of copolymer (MW was about 10000) and than was allowed to react in room temperature for 30 minutes to obtain an organic/inorganic hybrid material. This hybrid material was then spin coated on a transparent substrate and UV cured to form a thin film. The reaction and sequential processes was shown as below:

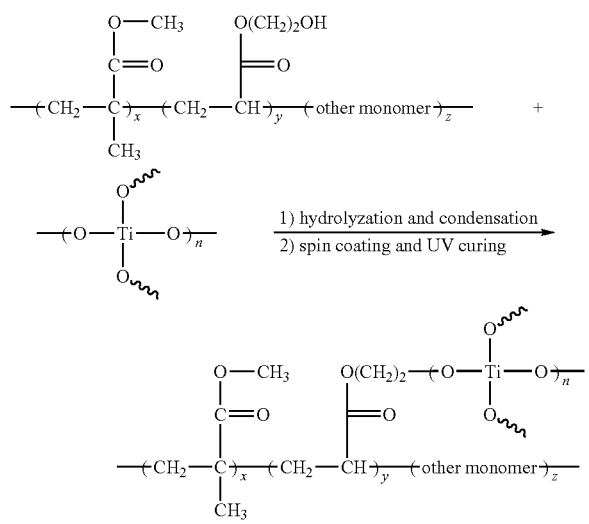

The metal alkoxide oligomer slightly influenced the light transmission ratio of the copolymer, however, the hybrid material had higher $T_g$ and refractive index. The properties corresponding to content ratio of the titanium alkoxide oligomer were shown as in Table 2.

TABLE 2

| Copolymer composition | Titanium alkoxide content ratio (wt %) | $T_g$ (° C.) | Light transmission ratio (%) | Refractive index |
|---|---|---|---|---|
| MMA/MAAM/SM/ HEMA = 60/32/7/1 | 0 | 159.2 | 91.2 | 1.51 |
|  | 15 | 160.7 | 90.9 | 1.67 |
|  | 30 | 161.5 | 90.7 | 1.71 |

Note:
SM is styrene and HEMA is 2-hydroxy ethyl methacrylate.

Because hydrogen bonding interaction is easily formed between water and carbonyl group of the PMMA, pure PMMA has higher moisture absorption. For reducing the moisture absorption of the PMMA, hydrophobic segments such as non-polar styrene was introduced to the copolymer containing PMMA. FIG. 5 shows the moisture absorption tests of the pure PMMA polymer and the poly(MMA-co-MAAM-co-S) copolymer. Because hydrogen bonding is more easily formed between water and the MAAM monomer, poly(MMA-co-MAAM) has a higher moisture absorption compared to pure PMMA polymer. However, the introduction of PS efficiently reduced the moisture absorption of the copolymer. Poly(MMA-co-MAAM-co-S) copolymer had a high $T_g$ and low moisture absorption, such that the copolymer of the invention can replace pure PMMA or polycarbonate to be applied in high efficient optic devices with lower costs.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for manufacturing an organic/inorganic hybrid material, comprising:
   providing a copolymer and a metal alkoxide oligomer; and
   processing a sol-gel reaction to form an organic/inorganic hybrid material;
   wherein the copolymer is co-polymerized by methyl methacrylate, methyl acrylamide, and styrene; and
   wherein the sol-gel reaction has a reaction period of less than 30 minutes.

2. The method as claimed in claim 1, wherein the alkoxide oligomer comprises titanium alkoxide oligomer, zinc alkoxide oligomer, zirconium alkoxide oligomer, or combinations thereof.

3. The method as claimed in claim 1, wherein the copolymer and the metal alkoxide oligomer have a weight ratio of 20:80 to 80:20.

* * * * *